(12) United States Patent
Koren et al.

(10) Patent No.: US 11,552,884 B1
(45) Date of Patent: Jan. 10, 2023

(54) EFFICIENT CORE ROUTING

(71) Applicant: XSIGHT LABS LTD., Kiryat Gat (IL)

(72) Inventors: Guy Koren, Rishon Lezion (IL); Gal Malach, Gedera (IL); Erez Shaizaf, Nir Chen (IL)

(73) Assignee: XSIGHT LABS LTD., Kiryat Gat (IL)

( * ) Notice: Subject to any disclaimer, the term of this patent is extended or adjusted under 35 U.S.C. 154(b) by 157 days.

(21) Appl. No.: 17/028,940

(22) Filed: Sep. 22, 2020

Related U.S. Application Data (60) Provisional application No. 62/903,961, filed on Sep. 23, 2019.

(51) Int. Cl.
*H04L 12/835* (2013.01)
*H04L 45/00* (2022.01)
*H04L 45/02* (2022.01)
*H04L 45/64* (2022.01)

(52) U.S. Cl.
CPC .............. *H04L 45/38* (2013.01); *H04L 45/02* (2013.01); *H04L 45/64* (2013.01)

(58) Field of Classification Search
CPC .......... H04L 45/38; H04L 45/02; H04L 45/64
See application file for complete search history.

(56) References Cited

U.S. PATENT DOCUMENTS

| | | | |
|---|---|---|---|
| 2008/0025218 A1* | 1/2008 | Liu | H04L 47/10 370/254 |
| 2016/0057015 A1* | 2/2016 | Osborne | H04L 41/18 370/254 |
| 2017/0093686 A1* | 3/2017 | Uttaro | H04L 45/745 |
| 2018/0006935 A1* | 1/2018 | Mutnuru | H04L 67/1001 |
| 2021/0160175 A1* | 5/2021 | Gupta | H04L 45/74 |

* cited by examiner

*Primary Examiner* — Walli Z Butt
(74) *Attorney, Agent, or Firm* — Reches Patents (57) ABSTRACT

A method for managing traffic in a computerized system that may include routers and at least one edge device, the method may include performing traffic management operations for controlling traffic related to the routers while executing a first traffic management operations by the at least one edge device, and executing second traffic management operations by the routers.

15 Claims, 6 Drawing Sheets

EFFICIENT CORE ROUTING

CROSS-REFERENCE

This application claims priority from U.S. provisional patent Ser. No. 62/903,961 filing date Sep. 23, 2020 which is incorporated herein by reference.

BACKGROUND

Over time, as the network services evolved routers of a network had to manage multiple tasks that forces them to allocate multiple resources for added networking features.

These multiple tasks were aims to respond to the following requirements (but not limited to):
   a. An increased network scale called for the introduction of routing protocols
   b. Security issues.
   c. Quality of service support.
   d. Administrative domain crossing
   e. Traffic load balancing.

The increased network scale called for the introduction of routing protocols (e.g. BGP, RIP, OSPF). These protocols solved two problems: (1) calculation of the "best" path between any two endpoints is the network, and (2) controlling the size of the switching node (aka "router" or "bridge") forwarding table. The price of supporting routing was the introduction of a control-plane to routers. The control-plane is responsible for running the routing protocol. Namely, learn the network topology in a distributed manner, calculate the "best" path to every endpoint and configure the forwarding tables located in the router data-plane. A router, thus, includes two main components: (1) control-plane, implemented on a CPU running the routing protocol software, and (2) data-plane, implemented by a dedicated ASIC, responsible for packet-by-packet processing, e.g. taking a forwarding decision for each received packet.

Security—the need to control how network-users access and use the network resources called for implementing packet filters (aka ACL—Access Control List) capable of identifying specific sessions. For example, a filter could be configured to grant a specific user to access resource/service A, but deny access resource/service B. The filters process each packet and therefore are typically implemented in TCAM (Ternary Content Addressable Memory).

Quality of Service (QoS) Enforcement—originally the network provided best effort service. That is the throughput, task completion time and delay were functions of the instantaneous load on the network and there was no way to guarantee predictable performance. The need to guarantee performance brought the introduction of QoS Identification and Enforcement engines. That is, the bridge is now capable to apply a QoS profile by examining the packet header, for each packet. The QoS profile may include complex operations like rate control (policing), congestion avoidance that control the drop rate and congestion management that control when the packet is scheduled for transmission from the bridge.

Administrative domain crossing—when packets are routed among endpoints connected to different administrative domains, for example, among networks operated by different providers such as between an Enterprise network and a Network Service Provider, they must adapt to different policies. The most obvious differences would be different addressing policy and the use of different routing protocol. The common way to address these differences is to ask the edge routers to perform tunnel encapsulation/decapsulation. That is, at the domain boundary a packet would be encapsulated in a header that conform to the policies of the target domain—an operation called tunnel encapsulation. When the packet crosses back to the original domain the tunnel header is decapsulated.

Traffic Load balancing—traffic load balancing distributes the traffic load over multiple paths to improve the overall network performance. This operation requires the bridge to select a path for each packet while preserving packet order. Dynamic (or load aware) traffic load balancing required the bridge to (1) notify congestion events, (2) store received congestion event notification and (3) perform adaptive load balancing according to the dynamics of the congestion.

SUMMARY

There may be provided a method for managing traffic in a computerized system that may include routers and at least one edge device, the method may include performing traffic management operations for controlling traffic related to the routers while executing a first traffic management operations by the at least one edge device, and executing second traffic management operations by the routers. The term "while" refers to an allocation of tasks between the routers and the at least one edge device. Any timing relationship may be provided between the execution of the first traffic management operations and the second traffic management operations.

The at least some of the first traffic management operations are more complex that at least some of the second traffic management operations.

The second traffic management operations do not include packet header editing.

The each one of the first and second traffic management operations may include enforcing a quality of service policy.

The second traffic management operations may include data-plane operations.

The method may include executing third traffic management operations by a Software Defined Networks (SDN) controller.

The method may include applying address based routing wherein the applying of the address based routing may include maintaining, by each router, a forwarding table; repetitively sending, by each router, a directly connected neighbors report to the SDN controller; determining, by the SDN controller, paths over a network formed by the routers, wherein the determining is based, at least in part, on directly connected neighbors report sent from the routers; updating, by the SDN controller, a forwarding table of each router; and performing packets forwarding decisions, by each router, based on the forwarding table of the router.

The method may include applying segment or source routing, wherein the applying of the segment routing may include repetitively sending, by each router, a directly connected neighbors report to the SDN controller; determining, by the SDN controller, paths over a network formed by the routers, wherein the determining is based, at least in part, on directly connected neighbors reports sent from the routers; updating, by the SDN controller, a forwarding table of the edge device; building, by the edge device, a routing header for a packet to be transmitted to the network, and performing packets forwarding decisions, by each router, based on routing headers of the packets.

The routers may not maintain router forwarding tables.

The method may include applying address based routing, wherein the applying of the address based routing may include maintaining, by each router, a forwarding table;

updating, by the router and in a distributed manner, forwarding tables of the routers, wherein the updating may include calculating, in the distributed manner, paths over a network formed by the routers; and performing packets forwarding decisions, by each router, based on the forwarding table of the router.

The method may include applying segment routing, wherein the applying of the segment routing may include repetitively sending, by the routers and to the edge device, directly connected neighbors reports; determining, by the edge device, paths over a network formed by the routers, wherein the determining is based, at least in part, on directly connected neighbors reports sent from the routers; building, by the edge device, a routing header for a packet to be transmitted to the network, and performing packets forwarding decisions, by each router, based on routing headers of the packets.

The method may include applying segment routing, wherein the applying of the segment routing may include building, by the edge device and based on a load balancing policy, a routing header for a packet to be transmitted to the network; and performing a packet forwarding decision, by each router, based on the routing header of the packet.

The method may include applying address based routing, wherein the applying of the address based routing may include associating, by the edge device and based on a load balancing policy, a load balancing cookie with a packet to be transmitted to a network formed by the routers; and performing a packet forwarding decision, by each router, based on the load balancing cookie and a packet destination address of the packet.

There may be provided a non-transitory computer readable medium that stores instructions for: managing traffic in a computerized system that may include routers and at least one edge device, wherein the managing may include performing traffic management operations for controlling traffic related to the routers while executing a first traffic management operations by the at least one edge device, and executing second traffic management operations by the routers. The term "while" refers to an allocation of tasks between the routers and the at least one edge device. Any timing relationship may be provided between the execution of the first traffic management operations and the second traffic management operations.

The at least some of the first traffic management operations are more complex that at least some of the second traffic management operations.

The second traffic management operations do not include packet header editing.

The each one of the first and second traffic management operations may include enforcing a quality of service policy.

The second traffic management operations may include data-plane operations.

The non-transitory computer readable medium that stores instructions for executing third traffic management operations by a Software Defined Networks (SDN) controller.

The non-transitory computer readable medium may store instruction for applying address based routing wherein the applying of the address based routing may include maintaining, by each router, a forwarding table; repetitively sending, by each router, a directly connected neighbors report to the SDN controller; determining, by the SDN controller, paths over a network formed by the routers, wherein the determining is based, at least in part, on directly connected neighbors report sent from the routers; updating, by the SDN controller, a forwarding table of each router; and performing packets forwarding decisions, by each router, based on the forwarding table of the router.

The non-transitory computer readable medium may store instruction for applying segment or source routing, wherein the applying of the segment routing may include repetitively sending, by each router, a directly connected neighbors report to the SDN controller; determining, by the SDN controller, paths over a network formed by the routers, wherein the determining is based, at least in part, on directly connected neighbors reports sent from the routers; updating, by the SDN controller, a forwarding table of the edge device; building, by the edge device, a routing header for a packet to be transmitted to the network, and performing packets forwarding decisions, by each router, based on routing headers of the packets.

The routers may not maintain router forwarding tables.

The non-transitory computer readable medium may store instruction for applying address based routing, wherein the applying of the address based routing may include maintaining, by each router, a forwarding table; updating, by the router and in a distributed manner, forwarding tables of the routers, wherein the updating may include calculating, in the distributed manner, paths over a network formed by the routers; and performing packets forwarding decisions, by each router, based on the forwarding table of the router.

The non-transitory computer readable medium may store instruction for applying segment routing, wherein the applying of the segment routing may include repetitively sending, by the routers and to the edge device, directly connected neighbors reports; determining, by the edge device, paths over a network formed by the routers, wherein the determining is based, at least in part, on directly connected neighbors reports sent from the routers; building, by the edge device, a routing header for a packet to be transmitted to the network, and performing packets forwarding decisions, by each router, based on routing headers of the packets.

The non-transitory computer readable medium may store instruction for applying segment routing, wherein the applying of the segment routing may include building, by the edge device and based on a load balancing policy, a routing header for a packet to be transmitted to the network; and performing a packet forwarding decision, by each router, based on the routing header of the packet.

The non-transitory computer readable medium may store instruction for applying address based routing, wherein the applying of the address based routing may include associating, by the edge device and based on a load balancing policy, a load balancing cookie with a packet to be transmitted to a network formed by the routers; and performing a packet forwarding decision, by each router, based on the load balancing cookie and a packet destination address of the packet.

There may be provided a computerized system for managing traffic, may include routers and at least one edge device, wherein the computerized system is configured to perform traffic management operations for controlling traffic related to the routers by executing a first traffic management operations by the at least one edge device, and executing second traffic management operations by the routers. The term "while" refers to an allocation of tasks between the routers and the at least one edge device. Any timing relationship may be provided between the execution of the first traffic management operations and the second traffic management operations.

BRIEF DESCRIPTION OF THE DRAWINGS

In order to understand the invention and to see how it may be carried out in practice, a preferred embodiment will now be described, by way of non-limiting example only, with reference to the accompanying drawings.

DETAILED DESCRIPTION OF THE DRAWINGS

Any reference to a system should be applied, mutatis mutandis to a method that is executed by a system and/or to a non-transitory computer readable medium that stores instructions that once executed by the system will cause the system to execute the method.

Any reference to method should be applied, mutatis mutandis to a system that is configured to execute the method and/or to a non-transitory computer readable medium that stores instructions that once executed by the system will cause the system to execute the method.

Any reference to a non-transitory computer readable medium should be applied, mutatis mutandis to a method that is executed by a system and/or a system that is configured to execute the instructions stored in the non-transitory computer readable medium.

Any reference to a "solution" should be applied mutatis mutandis, to a method, system, and a non-transitory computer readable medium as illustrated below.

The term "and/or" is additionally or alternatively.

The number of routers or any other components may differ from those illustrated in the drawings. There may be any connectivity between any of the components illustrated in any of the drawings. Any reference to a single device (for example a single edge device) can be applied mutatis mutandis to multiple components.

Any component can be implemented to a redundant manner or in a non-redundant manner.

Reference to different components (for example smart edge device and SDN controller) does not mean that these components are implemented on different devices—any they may be implemented in a single device.

A thin router is a router that is configured to allocate less resources for managing traffic in relation to a router that is not offloaded by a smart edge device. Less may be—for example—less by at least 5, 10, 15, 20, 25, 30, 35 percent—or any other percentage. Traffic management may include, for example, at least one out of packet forwarding (see, examples of TABLE 1), security, quality of service support, administrative domain crossing, and traffic load balancing.

The entire system may support any traffic management task—but the thin routers are not required to solely execute these tasks—as they are offloaded by the edge devices.

Figure 1:
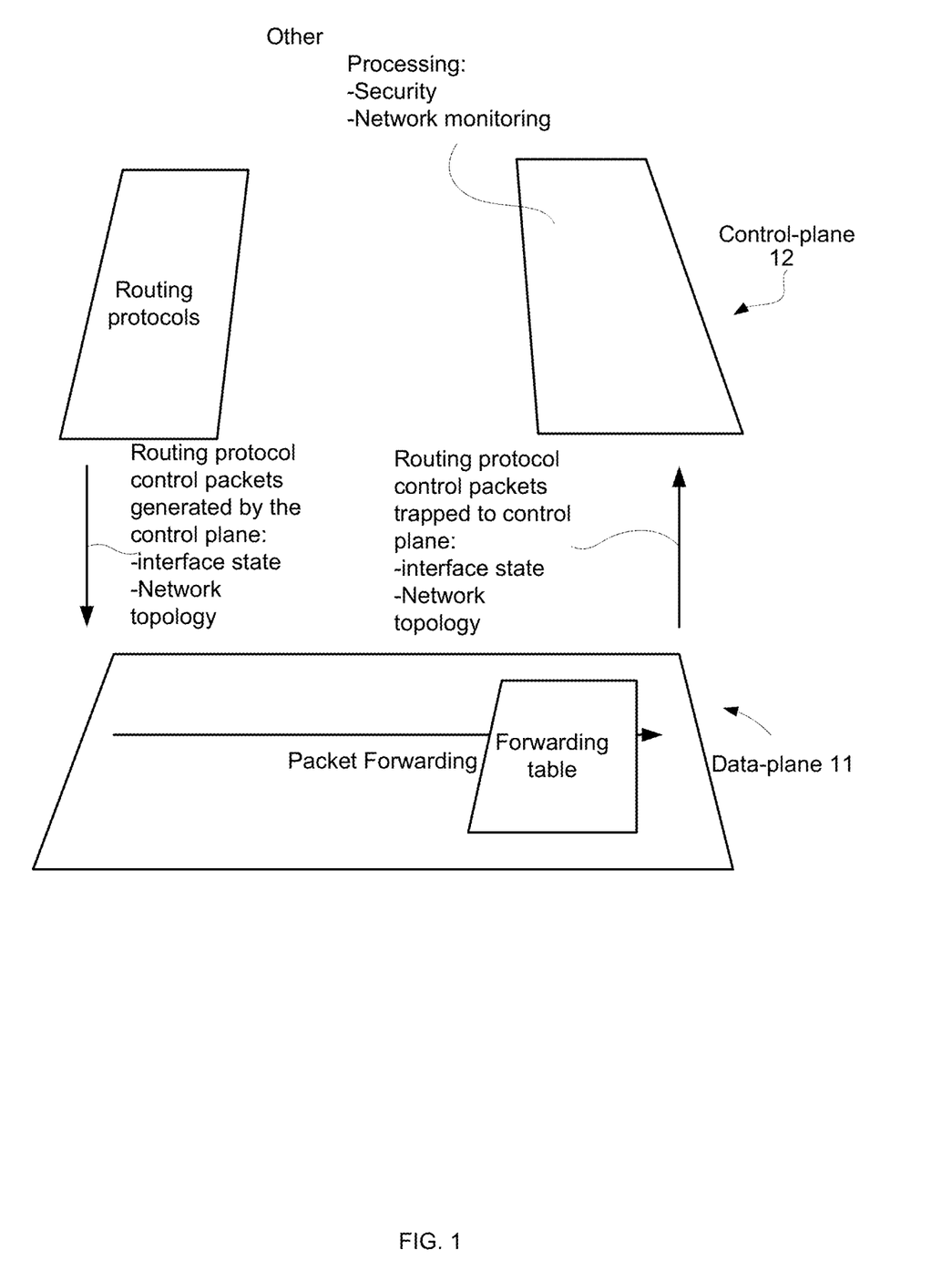
FIG. 1 shows the different functionality of the data-plane and the control-plane.
Figure 2:
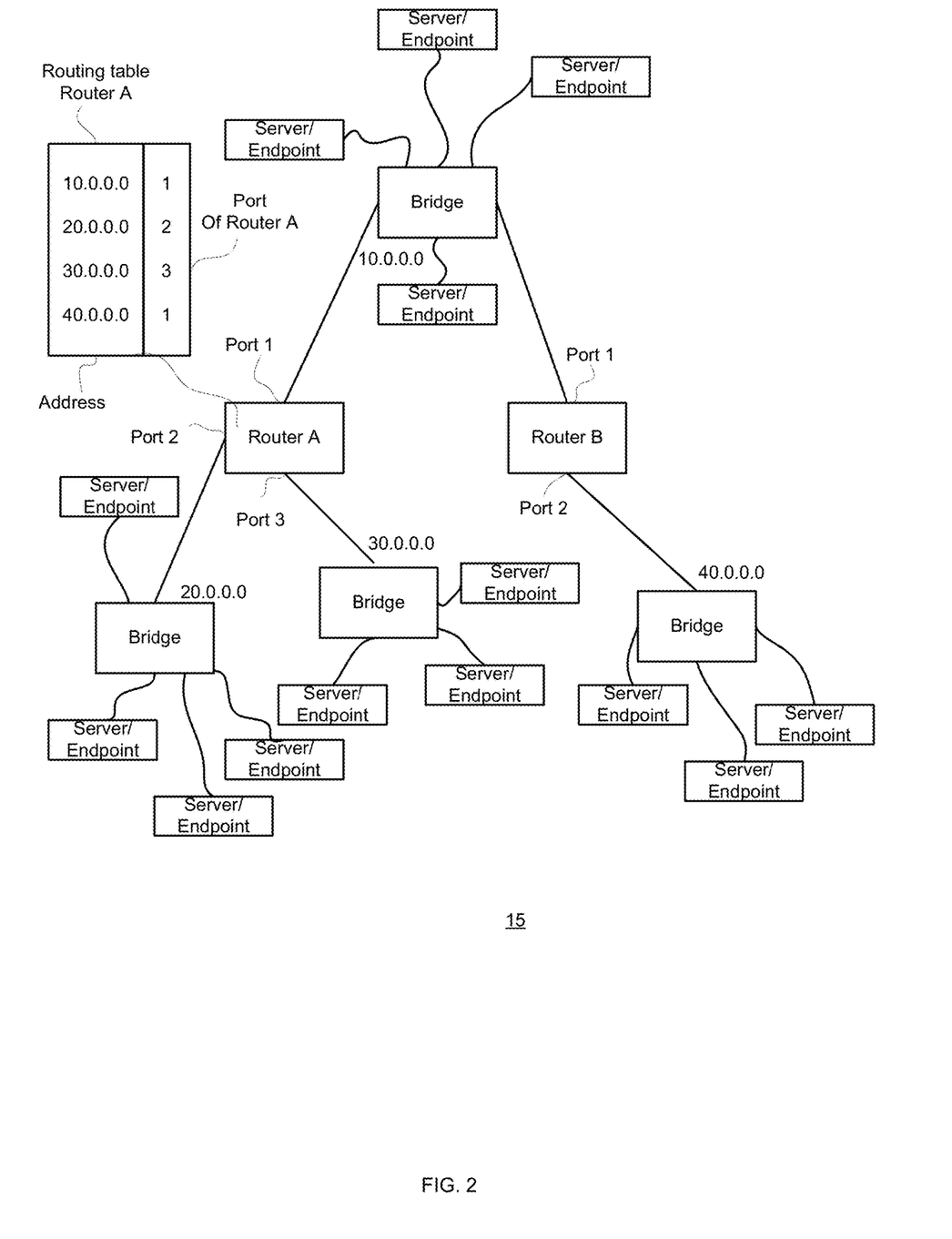
FIG. 2 illustrates an example of a network with two routers and multiple end point servers.

FIG. 2 shows network 15 with two routers (Router A, Router B), Bridges and multiple endpoint devices (aka edge devices). The endpoint device can be computing servers, storage servers, sensors, printers, firewalls, cash registers, industrial automation devices and any other device that use the network for communication.

On packet receive each router in the network perform packet processing and decide on the target port by searching the destination-IP within its local routing table. The processing is done repeatedly and independently in each router.

For example, in FIG. 2 a packet from source-IP 20.0.0.1 (belonging to address range 20.0.0.0) and destination-IP of 40.0.0.1 (belonging to address range 40.0.0.0) will get into Router-A using Port-2 then Router-A will perform packet processing where the destination-Ip 40.0.0.1 is compared against Router-A Routing Table (maps address ranges 10.0.0.0, 20.0.0.0, 30.0.0.0 and 40.0.0.0 to ports 1, 2, 3 and 1 respectively of Router A) which result in packet forwarding thru Port-1. Router-B gets the packet on Port 1 performs similar packet processing and forward the packet to Port-2.

Each router on the way need to perform packer processing without any knowledge/data share between the routers. This redundant router by router packet processing has the following implications:

a. Each router must maintain its own routing table (based on BGP or other protocol)
 b. Processing is done multiple time in each node for each packet—high power consumption and hence higher cost
 c. All routers within the network should handle all traffic from/to server's endpoints.

This means that in order to support large scale data centers the network topology must use large scale switch ASICs. However, due to process and manufacturability limitations the switch ASIC scale is limited. In addition, large amount of the ASIC area is used to instantiate packet processing engines.

Overview of Source/Segment Routing

Source routing, also called path addressing, allows a sender of a packet to partially or completely specify the route that a packet takes through the network. In contrast to conventional (address based) routing where routers in the network determine the path incrementally based on the packet's destination address. An example of Source Routing is defined in RFC 1812 (IPv4 Source Routing)

Segment Routing (SR) is a flexible, scalable way of doing source routing. The source chooses a path and encodes it in the packet header as an ordered list of segments. Segments are identifier for any type of instruction.

The segment routing architecture may be RFC 8402 compliant—or not.

Figure 3:
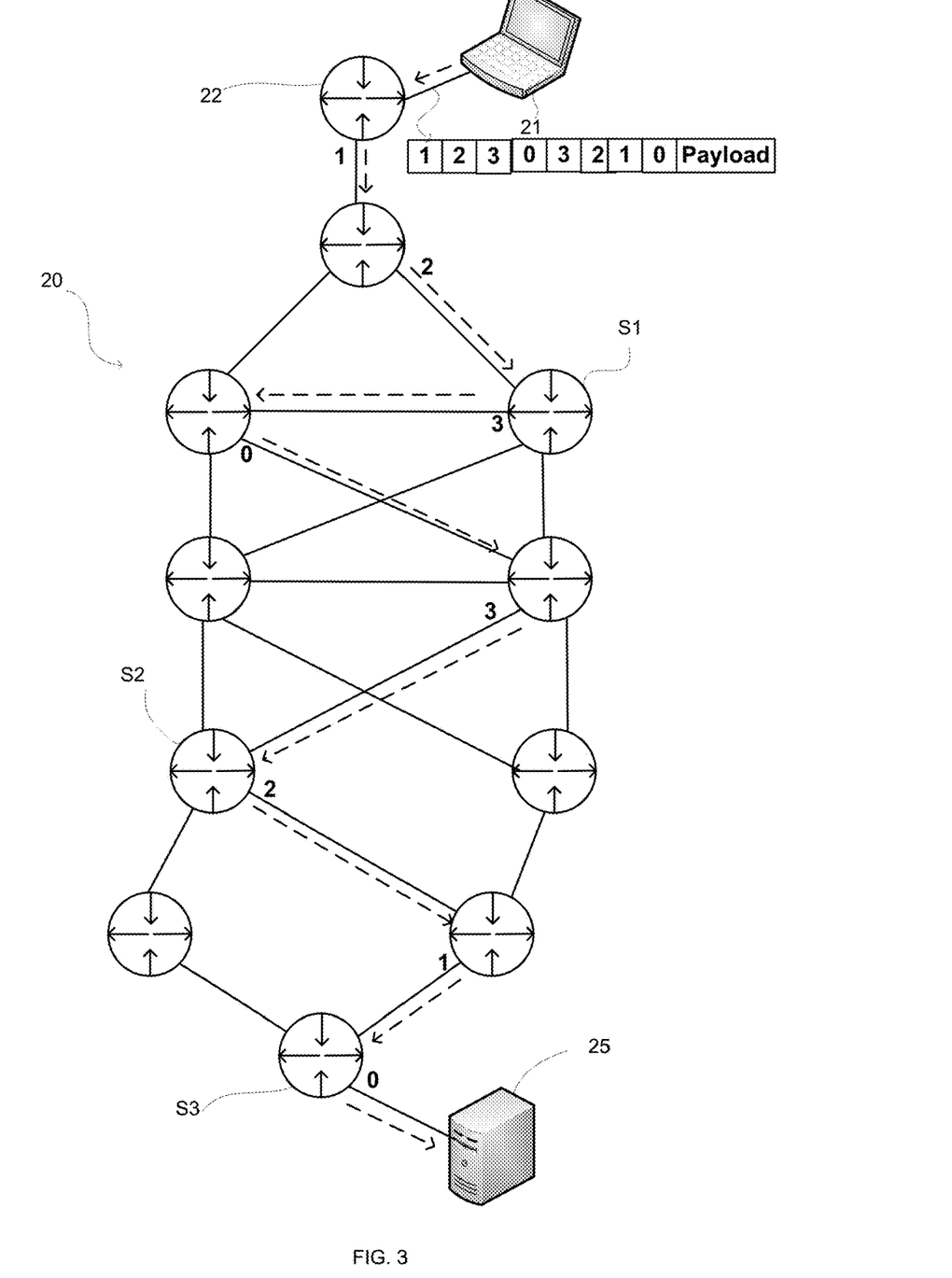
FIG. 3 is an example for source/segment routing.

FIG. 3 is an example for source/segment Routing.

The laptop 21 (at one side of network 20 of servers) generates a packet for the server 25 located on the other side of the network. However, instead of processing the packet multiple times in each router the SR-domain gating router 22 provides a complete order list of the path towards router S3 of the network. The path includes various routers.

Smart Edge Device

The Smart Edge Device is a network element that connect to an end-point device such as server and provides network connectivity to this end-point device. Besides the network connectivity (commonly, Ethernet) the Smart Edge device may contain one or more processing engines and one more ad-hoc hardware accelerators to allow packet processing and offloads processing tasks that the system CPU would normally handle.

The smart edge device may use a caching system to maintain the fabric state and generate end-to-end routing while omitting on-path routers processing.

Potential caching of the fabric state simplifying the core while keeping the following properties:

a. Same distributed control plane.
 b. In-par feature set.
 c. Backward compatibility.
 d. Smart fabric access.

A typical datacenter can be built by multi layers fabric that uses a thin router augmented by smart edge devices on each server. The interoperability between the fabric and the edge device enables significant cost saving and better network behavior.

The suggested solution simplifies the traffic management applied by the thin router, while preserving the rich feature set added to the network over time.

Various traffic management task (some may be referred to as "feature intelligence" tasks) may be executed by endpoint devices, leaving the switching nodes (thin routers) to do their most fundamental task: forward packets.

The edge device may include smart network interface cards (NICs). The packet forwarding may utilize a Software Defined Network (SND) controller or may determine forwarding tables (or other traffic management related decision) in a distributed manner.

An SDN controller allows to control and monitor a network, while not making this SDN controller a single point of failure.

SDN combines the ease and simplicity of central point of management with the reliability associated with distributed/redundant systems. Before SDN, networks were a set of routers and links connected together, showing very high resiliency but at the same time were very hard to manage because every router acted according to its own view of the network.

A smart NIC may be configured to perform network level functions such as routing, security, and interaction with the network congestion mechanisms.

Packet Forwarding.

Packet forwarding has two main approaches—the Address-Based Routing and the segment routing.

Address-Based Routing—The router holds a forwarding table mapping an endpoint address to a router destination port. This approach requires holding (and maintaining) a forwarding table in every router and every packet must hold at least the address of the destination endpoint.

Segment Routing—The router does not hold a forwarding table. The endpoint must know the entire path (hop by hop) to the destination endpoint and mark in the packet the egress port for every hop in the network.

Comparing the routing approaches, segment routing provides the maximum simplification scalability to the routers at the cost that the endpoint must have detailed knowledge of the network topology.

Both approaches require the existence of a control plane that learns the network topology, computes the "best" (or otherwise desired) paths among the endpoints and configures forwarding tables located either in the routers (if classical routing is used) or in the endpoints (if segment routing is used). A best or desired path may be determined in any manner.

The control plane can be implemented by an SDN controller or by a distributed routing protocol.

Figure 4:
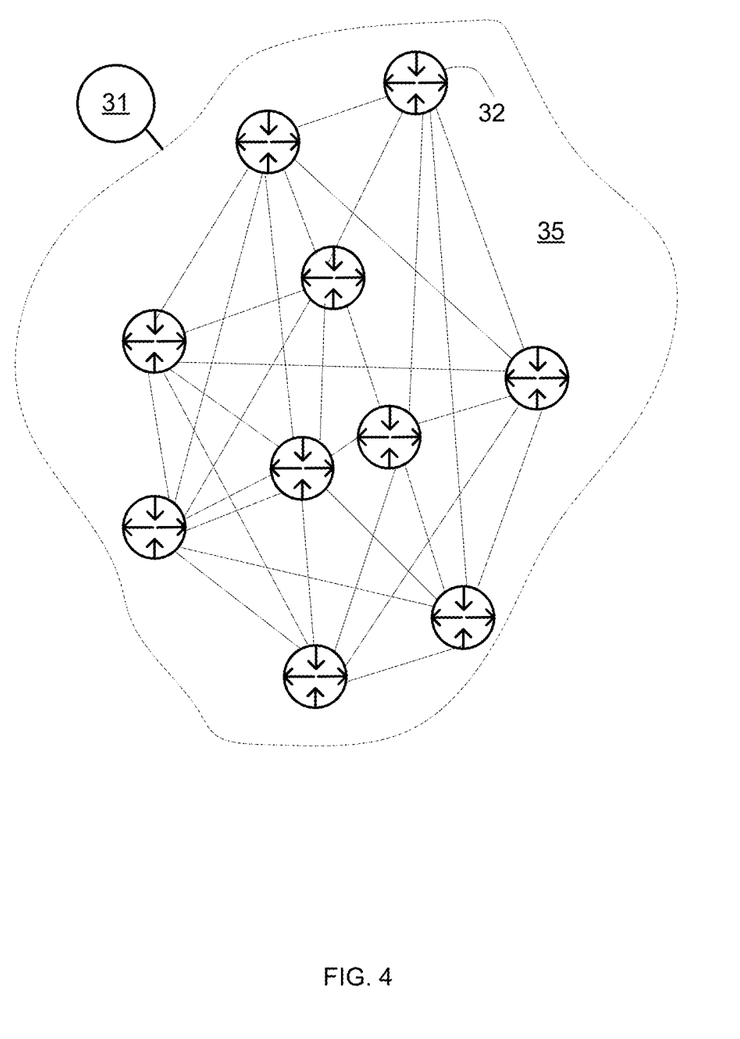
FIG. 4 illustrates an example of a system.

FIG. 4 illustrates a network 35 of thin routers 32 and a smart edge device 31 that communicates with the network.

Figure 5:
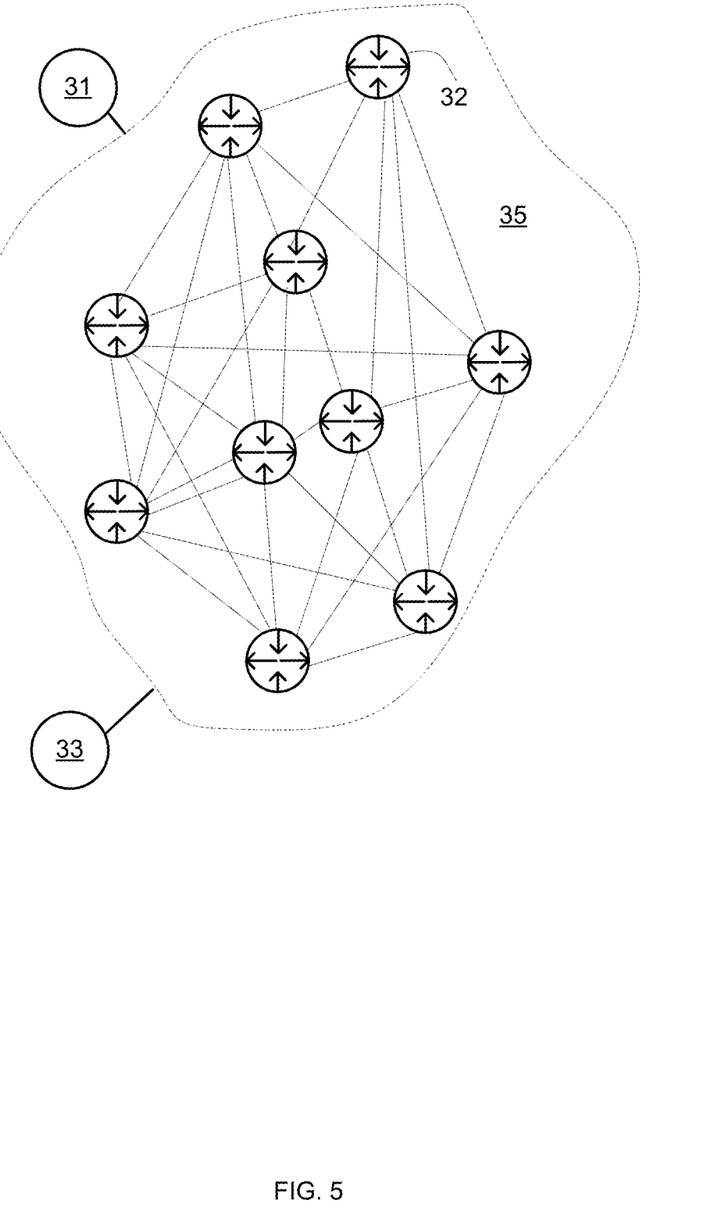
FIG. 5 illustrates an example of a system.

FIG. 5 illustrates a network 35 of thin routers 32, a smart edge device 31 and an SDN controller 33 that communicate with the network.

Central SDN controller—In this approach every router periodically reports to the SDN controller to which neighbors it is directly connected. The SDN controller uses this information to build the network topology and compute the "best" paths. It would then use the path information to configure the forwarding tables in the routers or the endpoints.

Distributed routing protocols (BGP, ISIS, OSPF, RIP, . . . )—In this approach the routers periodically exchange connectivity information. If the forwarding table is in the routers, each router constructs the network topology, calculates the "best" path and set its own forwarding table accordingly. In case of segment routing, the routers directly connected to the endpoints propagate the raw connectivity information to the endpoints and the endpoints construct the topology and the "best" paths.

Various implementation examples are illustrated below:

| | Address Based Routing | Segment Routing |
| --- | --- | --- |
| SDN Controller | Thin Router:<br>Data-plane holds a forwarding table<br>This table is updated by the SDN controller<br>Control-plane periodically reports directly connected reports to the SDN controller<br>SDN Controller:<br>Receives connectivity updates from the routers, build the network topology, computes the "best paths" and configures the routers forwarding tables<br>Smart Edge:<br>Not needed | Thin Router:<br>Forwarding table is not needed. Forwarding decisions are explicitly embedded in the packet header<br>Control-plane periodically reports directly connected neighbors to the SDN controller<br>SDN Controller:<br>Receives connectivity updates from the routers, build the network topology, computes the "best paths" and configures the smart edge forwarding tables<br>Smart Edge:<br>For every packet transmitted to the network, builds a routing header that include the destination port in every router along the packet path |
| Distributed Routing protocol | Thin Router:<br>Data-plane holds a forwarding table<br>This table is updated by the local control plane that run a distributed routing protocol<br>The local control plane exchanges connectivity information with its neighbors, builds the network topology, computes the "best paths" and configures the forwarding table of the local router<br>Smart Edge:<br>Not needed | Thin Router:<br>Forwarding table is not needed. Forwarding decisions are explicitly embedded in the packet header<br>Control-plane periodically exchanges connectivity information with neighbor routers.<br>Eventually, the network connectivity information diffuses to the Smart Edges<br>Smart Edge:<br>Control plane receives the connectivity information from the directly attached routers, builds the network topology and computes the "best paths"<br>For every packet transmitted to the network, builds a routing header that include the destination port in every router along the packet path |

SDN controllers maximize the simplicity of the routers because the routers do not have to store and propagate connectivity information (in case of segment routing) or compute topology and "best" paths (in case of classical routing). In presence of SDN controller, the router must report to the SDN controller no more than its directly connected neighbors. However, SDN controllers may suffer from connectivity lose if the network is fully partitioned, potentially leaving the partitioned network segment not functional. This is a known problem with the SDN approach, which keep distributed routing protocols a popular choice of deployment. As a result, routers should keep at least the connectivity map of each node. This means that a forwarding control plane can be eliminated from the router only if an SDN controller is used.

Both routing approaches (Address—Based and Segment Routing) may be IETF standard compliant.

Security—The ACL filters may be moved from the router to the Smart Edge.

The following QoS related functions can be moved from the router to the endpoint: QoS Identification which involves deciding the QoS handling for each packet and marking it (as a QoS profile) in the packet header. The QoS profile signals the required QoS handling to the routers. Standard methods to mark the QOS profile are 802.1p PCP and IP-DSCP.

Other QoS enforcement may not be implemented at the endpoint.

Administrative domain crossing (or prevention of packet header editing).

The following approaches de-necessitates packet header editing by the routers. When packets are not modified while they travel over the network, the routers data-plane is simpler and doesn't require packet checksum recalculation on each edit.
  a. A widely used protocol in datacenters is VXLAN. VXLAN requires tunnel encapsulation/decapsulation at the edge of the VXLAN domain (aka VTEP in-VXLAN Tunnel Endpoint). Moving the VTEP from the edge router (the router directly connected to the endpoint) to the Smart Edge (the endpoint) removes the need to perform packet header editing in the router.
  b. TTL (Time To Leave) counter, a counter being decremented on each hop, is replaced by time stamp and time synchronization. This approach mandates using time synchronization protocol. The required time accuracy for replacing the TTL with time is within milliseconds hence a simple control plane protocol such as NTP (Network Time Protocol) would satisfy Traffic Load Balancing Traffic load balancing can be performed by the endpoints as follows:
  a. If segment routing is used, the endpoint is free to dictate the exact network path, naturally supporting load balancing If an address based routing is used, the endpoint should calculate a Load Balancing cookie and mark it in the packet header. This cookie along with the packet destination address is used by the router for selecting one of N paths to the destination endpoint. For example, the VXLAN protocol carries the Load Balancing cookie in the UDP source port of the VXLAN tunnel Data-Plane Functions that should be Supported by the Thin Router The proposed network architecture does not call for synchronizing the access to the network among the endpoints, nor for bandwidth reservation for sessions. This means that every endpoint may attempt to access the network (and send traffic to any other endpoint) at any time and any bandwidth without the need for coordination in advance with other endpoints.

This means that packet forwarding uses the traditional statistical multiplexing approach that has the following toll on the thin router:

a. Packet buffers to minimize packet drop in case of congestion
  b. Congestion avoidance using (Active Queue Management) AQM
  c. Congestion notification to the endpoints
  d. Congestion management using traffic scheduling and shaping.

Figure 6:
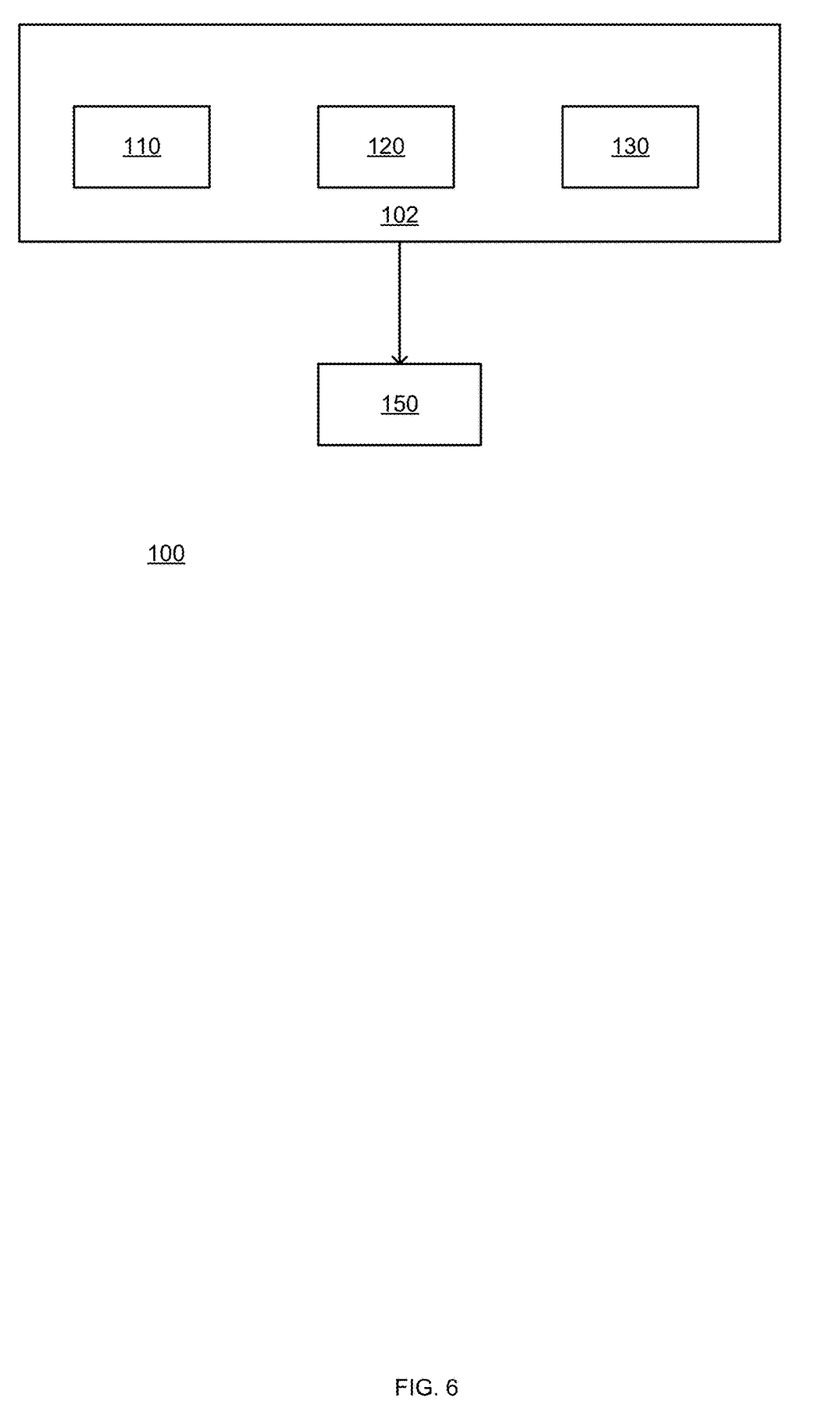
FIG. 6 illustrates an example of a method.

FIG. 6 is an example of a method 100 for managing traffic in a computerized system that comprises routers and at least one edge device.

Method 100 may include step 102 of performing traffic management operations for controlling traffic related to the routers.

Step 102 may include step 110 of executing a first traffic management operations by the at least one edge device.

Step 102 may include step 130 of executing second traffic management operations by the routers.

At least some of the first traffic management operations are more complex that at least some of the second traffic management operations.

The second traffic management operations (executed during step 130) do not include packet header editing.

The enforcing of quality of service may be executed in step 110 alone, in step 130 alone—or in both steps 110 and 130.

Step 130 may include executing data-plane operations.

Alternatively, the executing of the data plane operations may be executed in another step—for example in step 150.

Method 100 may include using an SDN controller.

When using an SDN controller, method 100 may include executing third traffic management operations by a Software Defined Networks (SDN) controller.

When using an SDN controller and applying address based routing—then the applying of the address based routing may include:
  a. Maintaining (during step 130), by each router, a forwarding table.
  b. Repetitively sending (during step 130), by each router, a directly connected neighbors report to the SDN controller.
  c. Determining (during step 120), by the SDN controller, paths over a network formed by the routers, wherein the determining is based, at least in part, on directly connected neighbors report sent from the routers.
  d. Updating (during step 120), by the SDN controller, a forwarding table of each router; and
  e. Performing packets forwarding decisions (during step 150), by each router, based on the forwarding table of the router.

When applying segment routing and using an SDN controller then—the applying of the segment routing may include:
  a. Repetitively sending (during step 130), by each router, a directly connected neighbors report to the SDN controller.
  b. Determining (during step 120), by the SDN controller, paths over a network formed by the routers, wherein the determining is based, at least in part, on directly connected neighbors reports sent from the routers.
  c. Updating (during step 130), by the SDN controller, a forwarding table of the edge device.
  d. Building (during step 110), by the edge device, a routing header for a packet to be transmitted to the network.
  e. Performing (during step 150) packets forwarding decisions, by each router, based on routing headers of the packets.

When applying segment routing and using an SDN controller then the routers are not required to maintain router forwarding tables.

When applying address based routing and a distributed protocol to determine forwarding table then the applying of the address based routing may include:
  a. Maintaining (during step 130), by each router, a forwarding table;
  b. Updating (during step 130), by the router and in a distributed manner, forwarding tables of the routers, wherein the updating comprises calculating, in the distributed manner, paths over a network formed by the routers.
  c. Performing (during step 150), packets forwarding decisions, by each router, based on the forwarding table of the router.

The method may include applying segment routing and applying a distributed protocol to determine forwarding decisions then the applying may include
  a. Repetitively sending (during step 130), by the routers and to the edge device, directly connected neighbors reports.
  b. Determining (during step 110), by the edge device, paths over a network formed by the routers, wherein the determining is based, at least in part, on directly connected neighbors reports sent from the routers.
  c. Building (during step 110), by the edge device, a routing header for a packet to be transmitted to the network.
  d. Performing (during step 150), packets forwarding decisions, by each router, based on routing headers of the packets.

Step 110 may include building, by the edge device and based on a load balancing policy, a routing header for a packet to be transmitted to the network.

Step 150 may include performing a packet forwarding decision, by each router, based on the routing header of the packet.

Step 110 may include associating, by the edge device and based on a load balancing policy, a load balancing cookie with a packet to be transmitted to a network formed by the routers.

Step 130 may include performing a packet forwarding decision, by each router, based on the load balancing cookie and a packet destination address of the packet.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

The phrase "may be X" indicates that condition X may be fulfilled. This phrase also suggests that condition X may not be fulfilled. For example—any reference to a system as including a certain component should also cover the scenario in which the system does not include the certain component. For example—any reference to a method as including a certain step should also cover the scenario in which the method does not include the certain component. Yet for another example—any reference to a system that is configured to perform a certain operation should also cover the scenario in which the system is not configured to perform the certain operation.

The terms "including", "comprising", "having", "consisting" and "consisting essentially of" can be replaced mutatis mutandis. For example—any method may include at least the steps included in the figures and/or in the specification, or may include only the steps included in the figures and/or the specification. The same applies to the system and/or to the non-transitory computer readable medium.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any combination of any component of any component and/or unit that is illustrated in any of the figures and/or specification and/or the claims may be provided.

Any combination of steps, operations and/or methods illustrated in any of the figures and/or specification and/or the claims may be provided.

We claim:

1. A method for managing traffic in a computerized system that comprises routers and at least one edge device, the method comprises:

performing traffic management operations for controlling traffic related to the routers while executing a first traffic management operations by the at least one edge device, executing second traffic management operations by the routers; executing third traffic management operations by a Software Defined Networks (SDN) controller; and applying segment routing or source routing;

wherein the applying of the segment routing comprises:
repetitively sending, by each router, a directly connected neighbors report to the SDN controller;
determining, by the SDN controller, paths over a network formed by the routers, wherein the determining is based, at least in part, on directly connected neighbors reports sent from the routers;
updating, by the SDN controller, a forwarding table of the edge device;
building, by the edge device, a routing header for a packet to be transmitted to the network, and
performing packets forwarding decisions, by each router, based on routing headers of the packets.

2. The method according to claim 1 wherein at least some of the first traffic management operations are more complex that at least some of the second traffic management operations.

3. The method according to claim 1 wherein the second traffic management operations do not include packet header editing.

4. The method according to claim 1 wherein the each one of the first and second traffic management operations comprises enforcing a quality of service policy.

5. The method according to claim 1 wherein the second traffic management operations comprises data-plane operations.

6. A method for managing traffic in a computerized system that comprises routers and at least one edge device, the method comprises:

performing traffic management operations for controlling traffic related to the routers while executing a first traffic management operations by the at least one edge device, executing second traffic management operations by the routers; and executing third traffic management operations by a Software Defined Networks (SDN) controller;

applying address based routing wherein the applying of the address based routing comprises:
maintaining, by each router, a forwarding table;
repetitively sending, by each router, a directly connected neighbors report to the SDN controller;
determining, by the SDN controller, paths over a network formed by the routers, wherein the determining is based, at least in part, on directly connected neighbors report sent from the routers;

updating, by the SDN controller, a forwarding table of each router; and performing packets forwarding decisions, by each router, based on the forwarding table of the router.

7. The method according to claim 1 wherein the routers do not maintain router forwarding tables.

8. A method for managing traffic in a computerized system that comprises routers and at least one edge device, the method comprises:

performing traffic management operations for controlling traffic related to the routers while executing a first traffic management operations by the at least one edge device, executing second traffic management operations by the routers, and executing third traffic management operations by a Software Defined Networks (SDN) controller;

applying address based routing, wherein the applying of the address based routing comprises:

maintaining, by each router, a forwarding table;

updating, by the router and in a distributed manner, forwarding tables of the routers, wherein the updating comprises calculating, in the distributed manner, paths over a network formed by the routers; and performing packets forwarding decisions, by each router, based on the forwarding table of the router.

9. A method for managing traffic in a computerized system that comprises routers and at least one edge device, the method comprises:

Performing traffic management operations for controlling traffic related to the routers while executing a first traffic management operations by the at least one edge device, executing second traffic management operations by the routers;

and executing third traffic management operations by a Software Defined Networks (SDN) controller;

comprising applying segment routing, wherein the applying of the segment routing comprises:

repetitively sending, by the routers and to the edge device, directly connected neighbors reports;

determining, by the edge device, paths over a network formed by the routers, wherein the determining is based, at least in part, on directly connected neighbors reports sent from the routers;

building, by the edge device, a routing header for a packet to be transmitted to the network, and performing packets forwarding decisions, by each router, based on routing headers of the packets.

10. A non-transitory computer readable medium that stores instructions for: managing traffic in a computerized system that comprises routers and at least one edge device, wherein the managing comprises performing traffic management operations for controlling traffic related to the routers while executing a first traffic management operations by the at least one edge device, executing second traffic management operations by the routers; executing third traffic management operations by a Software Defined Networks (SDN) controller; and applying segment routing or source routing:

wherein the applying of the segment routing comprises:

repetitively sending, by each router, a directly connected neighbors report to the SDN controller;

determining, by the SDN controller, paths over a network formed by the routers, wherein the determining is based, at least in part, on directly connected neighbors reports sent from the routers;

updating, by the SDN controller, a forwarding table of the edge device;

building, by the edge device, a routing header for a packet to be transmitted to the network, and performing packets forwarding decisions, by each router, based on routing headers of the packets.

11. The non-transitory computer readable medium according to claim 10 wherein at least some of the first traffic management operations are more complex that at least some of the second traffic management operations.

12. The non-transitory computer readable medium according to claim 10 wherein the second traffic management operations do not include packet header editing.

13. The non-transitory computer readable medium according to claim 10 wherein the each one of the first and second traffic management operations comprises enforcing a quality of service policy.

14. The non-transitory computer readable medium according to claim 10 wherein the second traffic management operations comprises data-plane operations.

15. A computerized system for managing traffic, comprising routers and at least one edge device, wherein the computerized system is configured to perform traffic management operations for controlling traffic related to the routers by executing a first traffic management operations by the at least one edge device, executing second traffic management operations by the routers; executing third traffic management operations by a Software Defined Networks (SDN) controller; and applying segment routing or source routing;

wherein the applying of the segment routing comprises:

repetitively sending, by each router, a directly connected neighbors report to the SUN controller;

determining, by the SDN controller, paths over a network formed by the routers, wherein the determining is based, at least in part, on directly connected neighbors reports sent from the routers:

updating, by the SDN controller, a forwarding table of the edge device:

building, by the edge device, a routing header for a packet to be transmitted to the network, and performing packets forwarding decisions, by each router, based on routing headers of the packets.

\* \* \* \* \*